United States Patent [19]
Matsumoto et al.

[11] Patent Number: 6,030,573
[45] Date of Patent: *Feb. 29, 2000

[54] PROCESS FOR MANUFACTURING THERMOPLASTIC RESIN MOLDINGS

[75] Inventors: Masahito Matsumoto; Nobuhiro Usui, both of Osaka; Seiji Terashima, Chiba, all of Japan

[73] Assignee: Sumitomo Chemical Company, Limited, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/522,722

[22] Filed: Sep. 1, 1995

[30] Foreign Application Priority Data

| Sep. 1, 1994 | [JP] | Japan | 6-208643 |
| Jan. 12, 1995 | [JP] | Japan | 7-176171 |

[51] Int. Cl.$^7$ .......................... B29C 43/04; B29C 43/20; B29C 45/04; B29C 70/46
[52] U.S. Cl. ................... 264/511; 264/259; 264/328.7; 264/328.8
[58] Field of Search .............. 264/328.7, 328.8, 264/511, 546, 328.16, 259

[56] References Cited

U.S. PATENT DOCUMENTS

| 3,861,841 | 1/1975 | Hanning | 425/146 |
| 3,906,066 | 9/1975 | Barrie | 264/328.7 |
| 4,092,385 | 5/1978 | Balevski et al. . | |
| 5,053,179 | 10/1991 | Masui et al. . | |
| 5,096,652 | 3/1992 | Uchiyama et al. | 264/259 |
| 5,130,075 | 7/1992 | Hara et al. . | |
| 5,132,071 | 7/1992 | Sorensen | 264/259 |
| 5,178,708 | 1/1993 | Hara et al. | 264/259 |
| 5,178,815 | 1/1993 | Yokote et al. | 264/259 |
| 5,308,570 | 5/1994 | Hara et al. | 264/259 |
| 5,336,463 | 8/1994 | Hara et al. | 264/328.7 |
| 5,352,397 | 10/1994 | Hara et al. | 264/259 |
| 5,356,588 | 10/1994 | Hara et al. | 264/259 |
| 5,389,315 | 2/1995 | Yabushita . | |
| 5,543,094 | 8/1996 | Hara et al. | 264/259 |

FOREIGN PATENT DOCUMENTS

| 2 0 043 174 | 1/1982 | European Pat. Off. . | |
| 0247359 | 12/1987 | European Pat. Off. | 264/511 |
| 2 0 477 967 | 4/1992 | European Pat. Off. . | |
| 1 0 491 682 | 6/1992 | European Pat. Off. . | |
| 0551526 | 7/1993 | European Pat. Off. | 264/511 |
| 1 0 596 588 | 5/1994 | European Pat. Off. . | |
| 3015723 | 1/1988 | Japan | 264/328.7 |
| 3027222 | 2/1988 | Japan | 264/511 |
| 0298416 | 9/1993 | Japan . | |

OTHER PUBLICATIONS

Patent Abstracts of Japan—vol. 12, No. 212 (M–710) [3059], Jun. 1988—JP–A–63 015723 (Toshiba Mach Co., Ltd.).

Patent Abstracts of Japan—vol. 14, No. 311 (M–994) [4254], Jul. 1990—JP–A–02 102010 (Japan Steel Works Ltd).

Michaeli et al., 'Kaskadenspritzgiessen Analysiert Und Mit Cadmould Berechnet Cascade Injection Moulding Analysed And Calculated Using Cadmould', Plastverarbeiter, vol. 45, No. 11, pps. 96, 98, 100, 102, Nov. 1994.

Gauler, K., 'BindenÄhte Von Spritzgiessteilen Beseitigen'Plastverarbeiter, vol. 37, No. 10, pps. 226–228, Oct. 1986.

JÄger et al., The Economical and Flexible Alternative to Laminating, Plastverarbeiter, vol. 2, No. 2, pps. 30–32, 34, Oct. 1991.

*Primary Examiner*—Leo B. Tentoni
*Attorney, Agent, or Firm*—Pillsbury Madison & Sutro LLP

[57] ABSTRACT

A process for manufacturing thermoplastic resin moldings in a short molding cycle but with good appearance, nearly free from resin and deformation, and free from weld lines on the surface. The process uses a mold assembly which includes a pair of male and female molds, either of which has two or more freely opening and closing resin feeding gates open to the cavity surface. Also, there is a mechanism for controlling the quantity of resin to be fed from each gate and the timing of the initiation of resin feeding.

20 Claims, 5 Drawing Sheets

PROCESS FOR MANUFACTURING THERMOPLASTIC RESIN MOLDINGS

BACKGROUND OF THE INVENTION

1. Field of the Invention

The present invention relates to a process for manufacturing thermoplastic resin moldings in a short molding cycle. The resin moldings are nearly free from resin warp, exhibit minimal deformation, and have good appearance.

2. Related Background Art

Thermoplastic resin moldings can be used in various applications including interior parts of automobiles (for example, door trims, rear trims, instrument panels), exterior and interior parts of household appliances, sundries, and the like. Thermoplastic resin moldings are typically manufactured by injection molding or press molding.

If desired, the surfaces of thermoplastic resin moldings can have a skin material entirely or partly laminated thereon. Entirely or partly laminated means that, respectively, the surface of the molding is entirely or partly covered with an integrally laminated skin material.

For injection molding processes, molten and plasticized thermoplastic resin (hereinafter sometimes referred to simply as "resin") is filled via a resin feed gate in a hermetically sealed mold cavity at high pressure. This generates a so-called oriented resin and may result in molding deformation, such as a twist or warp in the thermoplastic molding. The warp of resin can be particularly pronounced in the vicinity of the feed gate. Twisting or warping is disadvantageous.

For conventional press molding processes, molten resin is fed between open opposing male and female molds, is allowed to uniformly run on at least one of the mold surfaces, and is shaped by clamping together the male and female molds. The thermoplastic resin molding is nearly free from warp, and deformation is scarcely generated in the resultant thermoplastic resin moldings. However, because the molten thermoplastic resin is generally fed through a plurality of resin feeding gates, the obtained moldings have conspicuous weld-lines on their surfaces and a defective appearance, as well as strength problems. Raising the mold temperature during molding can reduce the generation of weld-lines. This means, however, that it will take a long time to cool and solidify the molten resin, resulting in a relatively long molding cycle.

SUMMARY AND OBJECTS OF THE PRESENT INVENTION

As a result of intensive study, the present inventors have discovered a process for manufacturing moldings having a good appearance in a short molding cycle while retaining advantages of a press molding process and producing moldings which are nearly free from resin warp and in which deformation is minimal. A thermoplastic resin molding in which deformation is minimal is a molding which hardly deforms when it is removed from the mold cavity, i.e., the molding exhibits minimal deformation.

Objects of the present invention include providing a process for manufacturing moldings in a short molding cycle having minimal deformation, wherein the moldings have a good appearance, and at least one surface of which can be integrally laminated entirely or partly with a skin material.

Other objects of the present invention include providing a process for manufacturing moldings in a short molding cycle which have a skin material laminated entirely or partly on the surface, which exhibit minimal deformation and warp of resin, and have good appearance.

The present invention is for a process for manufacturing thermoplastic resin moldings from molten thermoplastic resin and a mold assembly, with the mold assembly comprising a male mold and a female mold and the male and female molds each having opposing mold surfaces. The mold assembly is able to open and close and define a mold cavity between the opposing mold surfaces. The mold cavity defines a cavity clearance which can be greater than, less than, or approximately equal to a cavity clearance defining a final thickness of a molding of the thermoplastic resin. At least one of the male or female mold contains at least first and second thermoplastic resin feeding gates adjacent to each other, with the thermoplastic resin feeding gates individually being in an opened or closed communicating relationship with respect to the mold cavity. The thermoplastic resin feeding gates include means, a device, or devices for controlling the timing and feeding of a quantity of molten thermoplastic resin from each feeding gate into the mold cavity. The process comprises the steps of:

(a) feeding a first portion of the molten thermoplastic resin into the mold cavity from the first feeding gate while the first feeding gate is open and the mold assembly is open;

(b) spreading the first portion of molten thermoplastic resin in the mold cavity, whereby a flow front is created in the first portion of molten thermoplastic resin, by partially closing the mold assembly, wherein the cavity clearance is kept greater than the cavity clearance defining the final thickness of the molding;

(c) feeding a second portion of the molten thermoplastic resin from the second feeding gate when the second feeding gate is open and about when the flow-front of the molten thermoplastic resin passes the second feeding gate;

(d) optionally, repeating steps (b) and (c) with additional portions of the thermoplastic resin and additional feeding gates, until all of the molten thermoplastic resin is fed, while maintaining the cavity clearance greater than the cavity clearance defining the final thickness of the molding;

(e) closing the mold assembly until the cavity clearance becomes approximately equal to the cavity clearance defining the final thickness of the molding;

(f) cooling the molten resin in the mold assembly with application of pressure to solidify the thermoplastic resin; and (g) opening the mold assembly and recovering the thermoplastic resin from the mold assembly.

By this method, resin moldings having good appearance and minimal resin warp, deformation and weld-lines on the surface can be manufactured in a short molding cycle. In addition, by placing a skin material entirely or partly on the mold cavity surface, it is possible to manufacture thermoplastic resin moldings with the skin material laminated entirely or partly on the surface.

Another embodiment of the process for manufacturing thermoplastic resin moldings from molten thermoplastic resin and the aforementioned mold assembly comprises the steps of:

(a) closing the mold assembly until the cavity clearance is less than or approximately equal to the final thickness of the molding;

(b) opening the mold assembly while the cavity clearance is kept less than or approximately equal to the final thickness of the molding;

(c) feeding a first portion of a molten thermoplastic resin from a first gate wherein said cavity clearance is less than or approximately equal to the final thickness of the molding;

(d) continuing opening the mold assembly and feeding molten thermoplastic resin, wherein the cavity clearance becomes greater than the final thickness of the molding;

(e) spreading the molten thermoplastic resin within the mold cavity, whereby a flow front is created for the first portion of molten resin, by partially closing the mold assembly, wherein the cavity clearance is kept greater than the final thickness of the molding;

(f) feeding a second portion of the molten thermoplastic resin about when the flow-front passes the second gate;

(g) optionally, repeating steps (e) and (f) until all resin is fed while maintaining the cavity clearance greater than the final thickness of the molding;

(h) closing the mold assembly until the cavity clearance becomes approximately equal to the final thickness of the molding;

(i) cooling the molten resin with application of pressure to solidity the thermoplastic molding; and (j) opening the mold assembly and recovering the thermoplastic molding from the mold assembly.

By this other embodiment, resin moldings with extremely good appearance, nearly free from resin warp, and with minimal deformation can be manufactured in a short molding cycle.

The present invention will be described with reference to the following drawings which illustrate and pertain to example(s) of the present invention. The drawings are not intended to limit the scope of the present invention.

DETAILED DESCRIPTION OF THE PRESENT INVENTION

Figure 1:
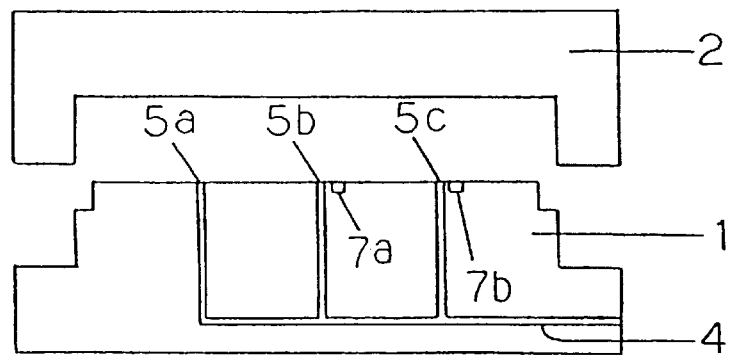
FIG. 1 is a schematic representation in section of a mold assembly used in the process according to the present invention.

The mold clamping device in the mold assembly (FIG. 1) used in the method according to the present invention comprises an upper platen (not illustrated) designed to be vertically movable by a known elevating mechanism(s) (not illustrated) and a fixed lower platen (not illustrated). As shown in FIG. 1, a male mold (1) is used together with an opposing female mold (2). Mold assemblies having upper and lower platens are described, for example, in U.S. Pat. No. 5,053,179 and in U.S. Pat. No. 4,092,385, the complete disclosures of which are incorporated herein by reference.

As shown in FIG. 1, on the male mold (1), two or more freely opening and closing gates which open to the mold cavity are mounted. The gates are connected to a resin plasticizing device (not illustrated) outside the mold assembly via a molten resin passage (4). In FIG. 1, three gates (5a), (5b) and (5c) are shown. However, the number and location of the above gates can vary and will be determined based on, for example, the size and the shape of moldings manufactured, the types of thermoplastic resin used, and other factors recognized by those skilled in the art.

Parameters such as, for example, resin temperatures, resin feeding pressures, and distances between the feeding gates can be varied from one molding to another, as known to those skilled in the art.

A valve (not illustrated) which is open when molten thermoplastic resin is fed to the cavity and is closed when it is not fed is installed with each gate. A controller (not illustrated) is used as a means to control, for example: (1) the amount of molten resin to be fed by adjusting the period of the opening time and the opening degree of the valves, and (2) the timing for molten resin feed initiation by detecting the passage of the flow-front of the molten resin at the gates by, for example, a thermal sensor(s) or the like installed with the gates. In FIG. 1, thermal sensors (7a) and (7b) are shown with gates (5b) and (5c).

The reference numerals described hereinabove with respect to FIG. 1, also apply to FIGS. 2 through 12.

Figure 2:
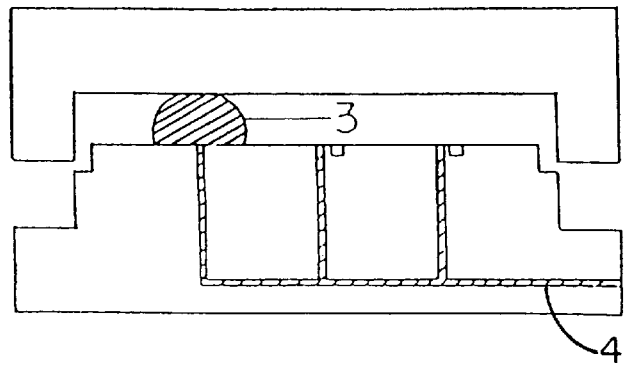
FIG. 2 shows a stage in the process according to the present invention using the mold assembly of FIG. 1 in which a first portion of a molten thermoplastic resin is fed from a first gate.

In a first embodiment, the mold assembly is brought to the open state and a portion of the total molten resin to be fed begins to be fed into the cavity from a first gate (for example, first gate (5a) as shown in FIG. 2). Possibly, in this event, the resin feeding pressure may act on the cavity surface facing the first gate (5a), and the cavity clearance between the molds may thus increase slightly. The scope of the present invention does not exclude this. This may occur in other molten resin feeding steps as well.

In the present invention, the "open state" should be interpreted as the state in which the cavity clearance between the male and the female molds is greater than a thickness of the final molding products. Except for special cases, in general, when the cavity clearance is greater than the final thickness of final resin products, it can be up to about seven times, but preferably, can be up to about five times the final thickness.

The first gate is at least one gate which is appropriately chosen from all gates in accord with parameters such as the shape of the final product, gate arrangement, and the like. In general, one resin feeding gate is selected as the first gate. However, a plurality of resin feeding gates can be used as the first gate. However, in the latter instance, the molding preferably has a portion which does not require an excellent outward surface appearance or which does not require mechanical strength, because weld lines may be generated.

FIG. 2 shows the state in which a portion of molten resin is being fed through resin feed line (4) through the first gate (5a) of the three gates (5a, 5b, 5c). The amount of molten resin fed from the first gate (5a) is not particularly limited, but in general, it is determined by using the amount of molten resin which enables the flow-front of molten resin (3) to pass a closed gate (e.g. second gate) adjacent to the first gate when the fed molten resin is spread into the mold cavity by partially closing the mold assembly while maintaining the cavity clearance greater than the thickness of final products in the subsequent process. When a plurality of second gates are present, the amount of molten resin can be determined by using the amount that enables the molten resin flow-front to pass the second gate located farthest from the first gate. This amount depends on factors such as the mold cavity clearance at the start of feeding of the molten resin, mold clamping speed, and the distance between the first and the second gates.

Figure 3:
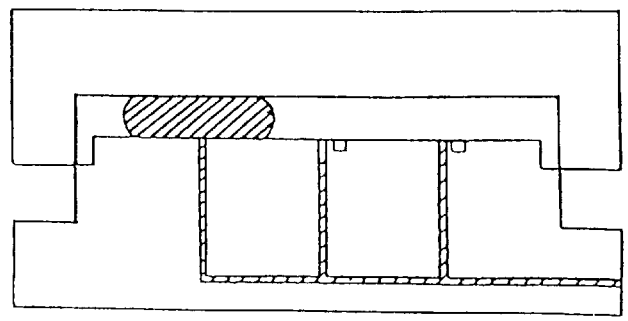
FIG. 3 shows a stage (mold assembly of FIG. 1) in which the molten thermoplastic resin fed from the first gate is spread by mold clamping thereby creating a flow front.
Figure 4:
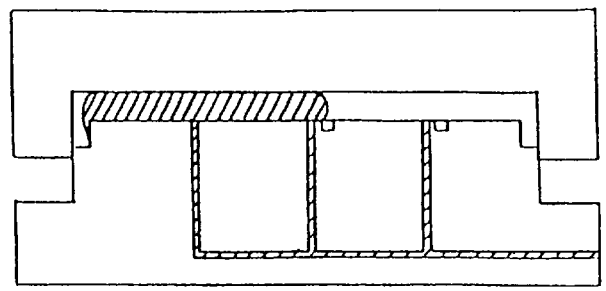
FIG. 4 shows a stage (mold assembly of FIG. 1) in which a flow front of the molten resin fed from the first gate has reached the closed gate adjacent to the first gate, hereinafter referred to as a "second gate" whereby the second gate is opened and molten resin is fed therethrough and allowed to spread.

The fed molten resin is spread into the cavity by the act of closing, or partially closing (mold clamping), the mold assembly while maintaining the cavity clearance therebetween greater than the final thickness of final resin products (FIG. 3). The timing of initiating mold clamping (e.g. lowering female mold (2)) may be, for example, after completing feed of a specified portion of molten resin or may be at the same time as (or while) molten resin is being fed.

When the flow-front (3) of spread molten resin has passed the second gate (5b) (FIG. 4), a portion of molten resin to be fed from the second gate (5b) begins to be fed in to the mold cavity. The resin is spread into the cavity by closing both male and female molds with the cavity clearance kept greater than the final thickness of the final products (FIG. 5).

A sensor (7a) located within the mole mold (1) adjacent to gate (5b) can detect an increase in temperature in the surrounding area due to the flow front (3) passing by gate (5b), and signals, for example, a gate controller (not shown) to open gate (5b) to allow further molten resin to be introduced behind flow front (3). The sensor can be, for example, a thermal sensor. For a thermal sensor, the triggering temperature of the thermal sensor (7a) can be selected depending on molding conditions as known to those skilled in the art. With regards to the thermal sensor (7), a tip of the sensor (7) can be at, or about at, the same level of the mold cavity surface.

Figure 5:
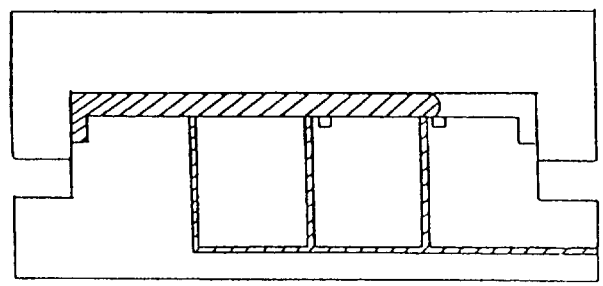
FIG. 5 shows a stage (mold assembly of FIG. 1) in which a flow-front of the molten resin previously fed from the first and second gates and spread by mold clamping has reached a closed gate adjacent the second gate, hereinafter referred to as a "third gate", whereby the third gate is opened and molten resin is fed therethrough.

The molten resin can be spread into the mold cavity by mold clamping the mold assembly of male and female molds, while maintaining the cavity clearance therebetween greater than the thickness of the final products (FIG. 5).

Figure 13:
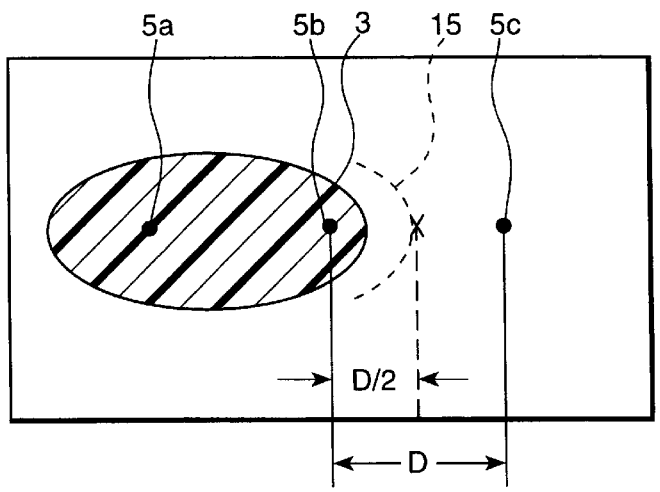
FIG. 13 shows the flow of molten thermoplastic resin past a feeding gate (top view), wherein the flow front has passed the gate but has not yet reached the point that is 50% the distance separating the feeding gate through which the flow front has just passed and the adjacent feeding gate which has not yet had resin flow through it.

The time when the flow-front of the molten resin has passed the gate is not limited to application at the instantaneous point when the flow-front has passed the gate. Rather, it also includes a time after the moment the flow-front has passed the gate to the moment the flow-front reaches the point 50%, preferably 40%, more preferably 30% of the distance separating the feeding gate through which the flow front just passed and the feeding gate adjacent to this last feeding gate but which has not yet had resin flow through it. For example, in FIG. 13, a top view is shown of the molten thermoplastic resin having a flow front (3) which has spread past gate (5b), but has not yet reached gate (5c). The distance D is the distance between the centers of gates (5b) and (5c), and point X is the point 50% of the distance separating feeding gate (5b) from (5c). Point (X) is a distance D/2 from gates (5b) and (5c). Molten resin can begin to flow through gate (5b), for example, about when the expanding flow front (15) reaches point (X).

Figure 14:
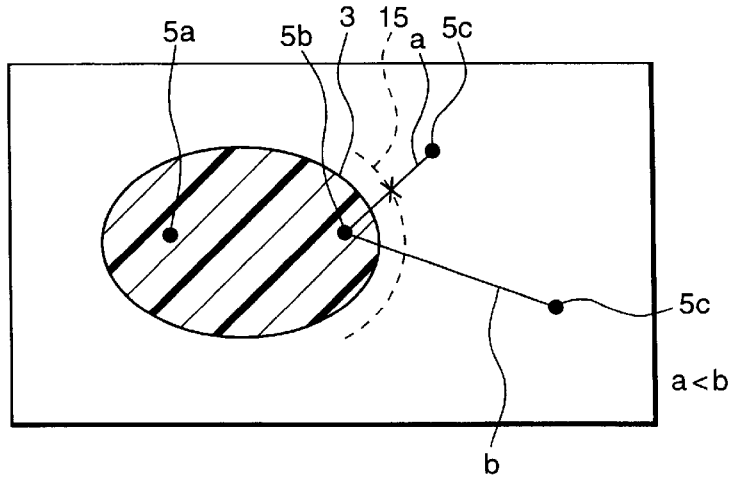
FIG. 14 shows the flow of molten thermoplastic resin past a feeding gate (top view). There are two gates (not equidistant from the gate through which the flow front has just past) which have not yet had resin flow therethrough.

If there are a plurality of adjacent closed gates relative to the gate where the flow-front passed, the above "time" can be defined by the distance between the adjacent closed gate closest to the gate over which the flow-front has passed. For example, in FIG. 14, the distance between gate (5b) and the nearest gate (5c) is called (a). Point (X) is halfway between gates (5b) and the nearest (5c). The distance between gate (5b) and the farthest gate (5c) is called b (a<b). In this situation, time is defined with respect to 50% of the distance (a) rather than 50% of the distance (b). Molten resin can begin to flow through gate (5b), for example, about when the expanding flow front (15) reaches point (X).

Figure 15:
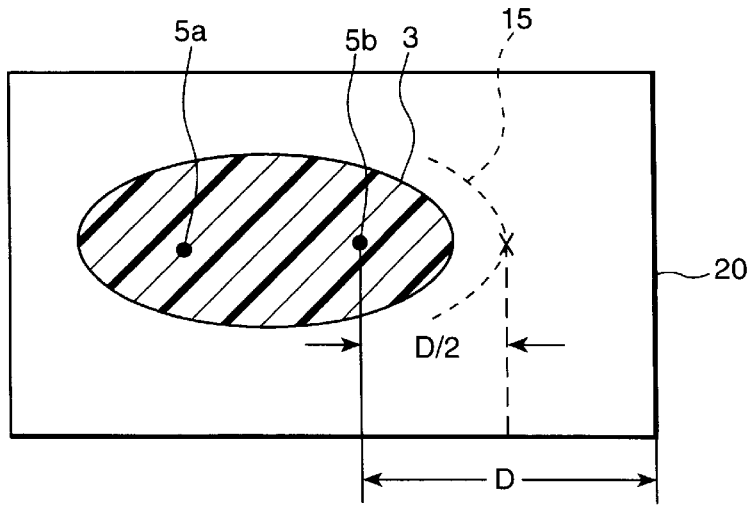
FIG. 15 shows the flow of molten thermoplastic resin past a feeding gate (top view) in the situation in which there is no adjacent non-feeding gate. In place of a non-feeding gate, a cavity edge is used as a reference point.

In another situation, if the gate through which the flow-front has passed is close to the edge of the cavity and there is no adjacent non-feeding gate, the "time" is defined from the distance between the gate and the cavity edge. In FIG. 15, cavity edge (20) is a distance (D) from gate (5b). Point (X) is halfway between gates (5b) and the cavity edge (20). Resin can begin to flow through gate (5b), for example, about when the expanding flow front (15) reaches point (X).

The amount of the molten resin to be fed from the second gate can be determined by such conditions as the cavity clearance at the start of feeding of the molten resin and mold clamping speed, and the distance between the second and the third gates (while taking into account in the same manner described above for feeding molten resin from the first gate, if there is a closed gate (third gate) adjacent to the second gate). If the second gate is close to the edge of the cavity and there is no adjacent non-feeding gate, the amount of molten resin fed generally is almost the amount that can cover the area from the second gate to the cavity edge. The molten resin feeding amount from the remaining gates can be determined in a similar manner.

Figure 6:
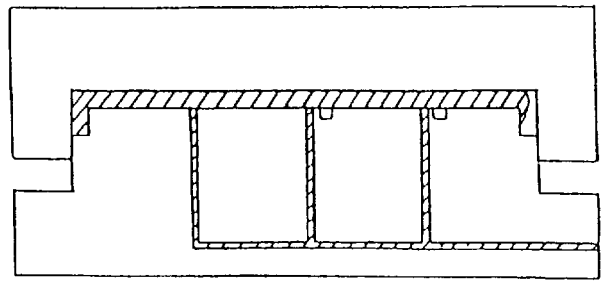
FIG. 6 shows a stage (mold assembly of FIG. 1) in which the molten resin fed from the first, second, and third gates is being spread by mold clamping.
Figure 7:
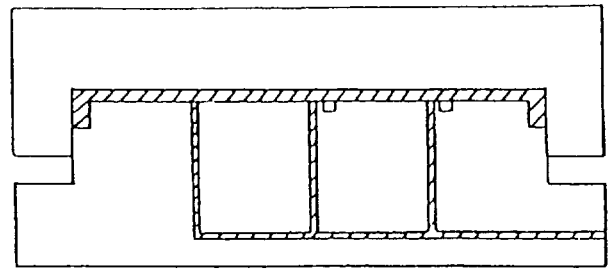
FIG. 7 shows the stage (mold assembly of FIG. 1) in which the molten resin filled in a mold cavity is cooled with pressure applied.

Depending on the shape and the size of the molding to be manufactured, the molten resin charge can be completed by feeding the molten resin from the first and the second gates as described above. However, when moldings with complicated profile or large-size moldings are manufactured, feeding and spreading of the molten resin (steps (b) and (c)) can be repeated as required in the same manner as specified above (e.g. with reference to gate (5c) and thermal sensor (7b)) and the molten resin charge is completed while maintaining the cavity clearance greater than the final thickness of final products (FIG. 6).

Upon completion of feeding the molten resin, both male and female molds (1) and (2) are partially closed or closed until the cavity clearance becomes approximately equal to the final thickness of final products. The molten resin is cooled with pressure applied, and thereafter, both male and female molds are opened to remove solidified final products. The amount of pressure applied is not critical and will be selected by molding requirements as is known to those skilled in the art. For example, the range of pressure applied during cooling is not more than about 150 kgf/cm$^2$, and preferably, is not more than about 100 kgf/cm$^2$.

In the present invention, it is essential to begin feeding the molten resin from the adjacent closed gate when, or at the time, the molten resin fed from a feeding gate has passed the closed gate adjacent to the feeding gate. In as far as this requirement is satisfied, whether or not mold clamping is carried out while the molten resin is being fed is not particularly limited. For example, it is possible to stop clamping while the molten resin is being fed from the gate and to restart clamping after completing feeding of molten resin from the gate. It is also possible to control the mold clamping speed and continuously clamp molds until feeding of all the molten resin is completed.

In addition, it is possible to combine these methods appropriately. For example, in principle it is possible to start mold clamping after feeding a specified amount of molten resin from the first gate (5a). Mold clamping can be temporarily stopped when the fed molten resin has spread into the mold cavity and the flow-front (3) has passed the closed gate (5b) adjacent to the gate (5a). A specified amount of molten resin can be fed through the gate (5b). Alternatively, mold clamping can be started while feeding a specified amount of molten resin from the gate (5a). Resin feeding through the gate (5b) can be started while continuing mold clamping, even after the flow-front of the molten resin being fed has passed the adjacent unfeeding gate (5b).

In contrast to the present invention, if an adjacent, closed, "unfeeding" gate (i.e. a gate from which molten resin has not been fed yet) is opened and molten resin feeding therethrough is commenced before the flow-front of the molten resin fed from a "feeding" gate has spread into the cavity and reached the adjacent closed gate, weld-lines are generated on the surface of the molten resin. When this happens it is not possible to obtain products having a good outward appearance. Consequently, it is essential to control the time at which molten resin feed is initiated. When the flow-front of the molten resin fed from an adjacent open feeding gate has spread and passed the adjacent closed gate, the latter is opened and molten resin feed is initiated therefrom.

Any method can be adopted for controlling the molten resin feed initiation timing. For example, in one embodiment, a thermal sensor (7) is buried (disposed within, and below the mold surface) in a portion of the mold near each gate. The thermal sensor (7) is preferably buried below the mold cavity surface on the side of the flowing direction of the molten resin. A gate associated with a thermal sensor (7) is opened to initial molten resin feed therethrough when the flow-front of the molten resin spread in the cavity passes over that area of the mold surface having buried thermal sensor and the thermal sensor detects a specified temperature whereby the associated gate is opened. If the amount of resin to be fed from each gate is specified and the mold clamping speed is specified, and the flow rate of the molten resin in the mold cavity is determined, it is possible to use a timer or other similar methods to control, at least in part, the time for opening for each gate or the sequencing of opening or closing gates. The amount of the molten resin to be fed from each gate can be controlled, for example, by adjusting the period of time for resin feed and/or the degree of valve opening for any or all gates.

The time for completing the feed of the molten resin from each gate is not particularly limited insofar as the cavity clearance is maintained greater than the thickness of final products. For example, the feed of the molten resin from the first gate can be completed before the flow-front of the fed molten resin reaches the second gate, or it may be completed after it has passed the second gate.

According to the present invention, skin material laminated resin moldings in which the skin material is entirely or partly laminated integrally on the surface of the resin moldings are obtainable by placing the skin material entirely or partly on the mold cavity surface before feeding the molten resin. In particular, this method can produce moldings having a skin material laminated to a part of the molding surface in which the skin material surface has an excellent appearance.

In this embodiment, before feeding the molten resin, both male and female molds are held in the open state to have the clearance greater than the thickness of the final products. The "open state" in this event is usually greater than the thickness of the final products. It can be substantially up to 50 times the thickness, and the cavity clearance is set appropriately within this range with consideration given to the thickness and other conditions of the skin material to be used.

In general, when manufacturing a thermoplastic resin having a surface molding laminated in whole or in part with a skin material, one resin feeding gate is chosen as the first gate. If, however, the molding has a portion which is not required to have an excellent appearance when applied or which does not need mechanical strength, a plurality of resin feeding gates can be used as the first gate with the understanding that weld-lines may be generated at those gates. Because weld-lines generated under the laminated portion of the skin material of the molding are hidden, it is also possible to choose a plurality of resin feeding gates as the first gate provided that any weld-lines which may be generated would be underneath the skin material.

In manufacturing the molding to which the skin material is laminated throughout a surface of the molding, the first gate can be chosen in a similar manner as in the case of manufacturing molding with the skin material partly laminated.

Figure 12:
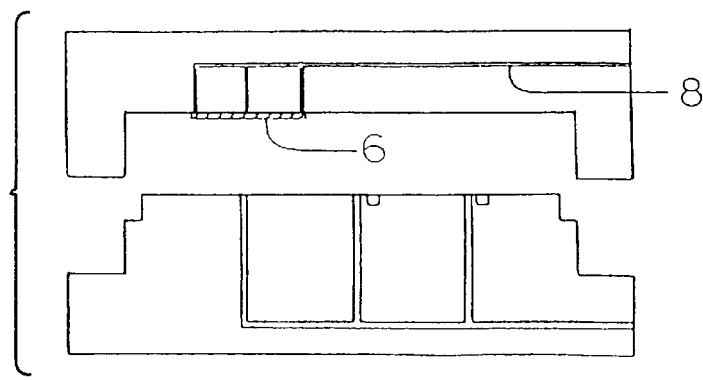
FIG. 12 is a schematic representation in section of a mold assembly used in the present invention when a skin material is partly laminated on the surface of the moldings in an embodiment wherein the gate to feed the molten resin first and the skin material are in a facing opposing relationship to one another.

When skin material laminated resin moldings are manufactured, the skin material (6) is placed so that it comes in contact with the cavity surface. For example, the cavity surface of the female mold (2) of the mold member faces the opposing cavity surface, which is the cavity surface of the male mold (1) of the mold member having a gate. If the thermoplastic resin molding is only partially laminated with skin material, as is shown in FIG. 12, it is preferable to provide the first gate at the position opposite to the position where the skin material is placed, particularly, at the position opposite to the center portion of the skin material placed.

Various known methods, i.e., known to those skilled in the art, can be adopted for fixing the skin material in place in the mold. In general, as shown in FIG. 12, a vacuum method for vacuum-sucking the skin material to the cavity surface of a mold via a vacuum applied through, for example, a vacuum chamber (8) can be used. In this embodiment, it is possible to vacuum-suck the skin material throughout the whole surface or vacuum-suck the peripheral portion only of the skin material depending on the size of the skin material to be laminated.

In general, the skin material for resin moldings is not particularly limited. Exemplary skin materials include woven fabric cloth, knitted cloth, unwoven fabric cloth comprised of various kinds of materials, sheets or films of thermoplastic resin or thermoplastic elastomer, or foams comprised of various resins such as a polyolefin-based resin, a polyvinyl chloride-based resin, a polyurethane-based resin, and the like. One or more skin materials can be employed. In particular, and by way of example, a multi-layered laminate skin material can comprise a sheet of foamed resin laminated to a thermoplastic resin or thermoplastic elastomer sheet or film. This exemplary multi-layered laminate is frequently used as a material that provides a cushioning property when laminated to a surface of the resin molding. Skin materials can, if desired, have patterns, such as a grain pattern, for aesthetic or other purposes.

Figure 8:
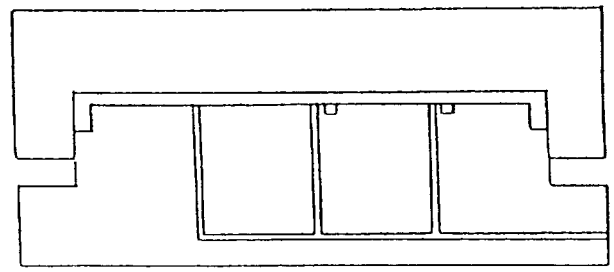
FIG. 8 shows a stage in the process according to the present invention using the mold assembly of FIG. 1 in which both the male and female molds are closed until the cavity clearance is not greater than the thickness of the final thermoplastic resin molding product before feeding of molten resin begins.
Figure 9:
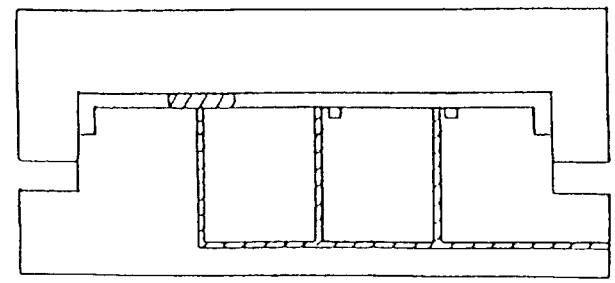
FIG. 9 shows a stage in the process according to the present invention using the mold assembly of FIG. 1 in which feeding of a part of the whole molten resin begins from the first gate wherein the cavity clearance is maintained not greater than the thickness of final thermoplastic resin moldings ("products").
Figure 10:
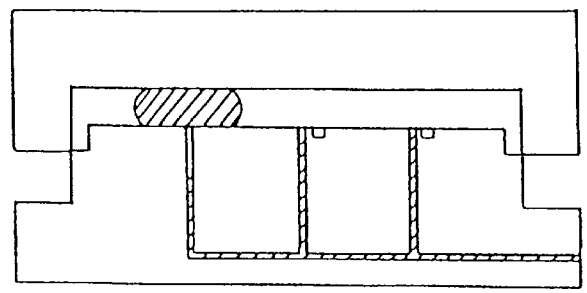
FIG. 10 shows a stage in the process according to the present invention using the mold assembly of FIG. 1 in which mold opening and feeding of molten resin are continued, the cavity clearance being greater than the thickness of final products.
Figure 11:
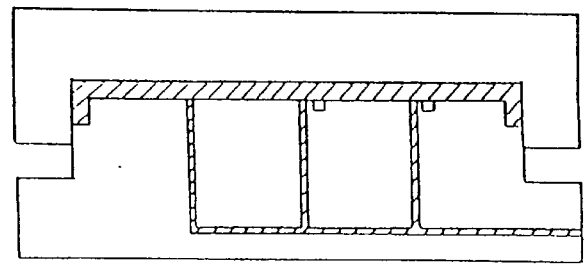
FIG. 11 shows a stage in the process according to the present invention using the mold assembly of FIG. 1 in which the molten resin, after filling in the cavity, is cooled with pressure applied.

In another embodiment according to the present invention, before starting to feed the molten resin, both the male and female molds (the mold assembly) are closed until the cavity clearance is not greater than the thickness of the final products (FIG. 8). Then, while initiating the opening of both the male and female molds but while maintaining the cavity clearance therebetween not greater than the thickness of the final product, a part of the whole molten resin to be fed begins to be fed from a gate (5a, first gate) (FIG. 9). The mold opening and feeding of the molten resin are continued while the cavity clearance is allowed to be greater than the thickness of the final products (FIG. 10).

The molten resin is spread further within the mold by clamping the molds together, but the cavity clearance is kept greater than the thickness of the final products. When the flow-front of the molten resin has passed the adjacent closed ("unfeeding") gate (5b, second gate) to the first gate (5a), a part of the whole molten resin to be fed begins to be fed from gate (5b). Thereafter, while the molten resin is spread by mold clamping, the molten resin can be fed through gate (5c) in the same manner as described above with reference to gate (5b), until the feed of a specified amount of the whole molten resin is completed through gate (5c) while maintaining the cavity clearance greater than the thickness of the final products.

Then, both male and female molds are closed until the cavity clearance becomes approximately equal to the thickness of the final products. The molten resin is cooled with pressure applied. The range of pressure applied during cooling is not more than about 150 kgf/cm, and preferably, is not more than about 100 kgf/cm. Both male and female molds are thereafter opened and the solidified final products are removed, i.e. de-molded. In this way, thermoplastic resin moldings having an excellent appearance can be manufactured.

With regard to a thickness of final molded products, for example, a thickness of interior trim for a car is in the range from about 1.5 mm to about 3.5 mm, and that of household appliances is in the range from about 1 mm to about 5 mm.

In principle, the thermoplastic resins suitable for manufacturing the molding are not restricted to a single resin. Thermoplastic resins heretofore used in compression molding, injection molding, extrusion molding, and like processes are suitable. Exemplary thermoplastic resins include polypropylene, polyethylene, acrylonitrile styrene-butadiene copolymers, polystyrene, polyamides such as nylon, polyvinyl chloride, polycarbonate, acrylic resin, styrene-butadiene copolymers, as well as thermoplastic elastomers such as EPM or EPDM, a mixture of any such resins or a polymer alloy of one or more resins. If desired, the resins may contain glass fiber, various inorganic or organic fillers, and/or various types of generally used pigments, lubricants, antistatic agents, stabilizers, foaming agents, and other various additives.

Processes for manufacturing thermoplastic resin moldings according to the present invention are described in Japanese Application 208643/1994 filed Sep. 1, 1994, and in Japanese Application 176171/1995 filed Jul. 12, 1995, the complete disclosures of which are incorporated herein by reference.

EXAMPLES

The following examples further illustrate the present invention without limiting its scope.

In the following examples, the thermoplastic molding resin is polypropylene resin (Sumitomo Chemical, "Sumitomo NOBLEN BPZ5077").

Example 1

Using the mold assembly with the rough section shown in FIG. 1, a box type (react rectangle) molding was manufactured in accordance with the process shown in FIGS. 2–7. The size of the molding was 800 mm long, 550 mm wide, 10 mm high, and 2.5 mm thick.

In this Example, resin feeding gates (5a, 5b and 5c) were arranged with the center of each gate located on the center line in the width direction of the mold cavity and at 3 locations equally spaced from both edges in the longitudinal direction of the mold cavity. The thermal sensors (7a, 7b) were located adjacent to the gates (5b) and (5c), respectively, and in the flowing direction of molten resin. Each gate was equipped with a valve.

Both male and female molds were opened so that the cavity clearance therebetween was 3 times the thickness of the final products. The female mold (2) was lowered towards the male mold (1), and while molten polypropylene resin (resin temperature 200° C., same temperature also applies to the other examples) was fed from the resin feeding gate (5a) in 42 wt % of the total feed amount of resin by controlling the period of time in which the valve for gate (5a) was open. Gates (5b) and (5c) were closed at this time.

After completing the resin feed through gate (5a), mold clamping was continued to effect spreading of the molten polypropylene resin into the mold cavity, and when the thermal sensor (7a) detected that the temperature near the surrounding area reached 80° C., the valve mounted to the lower part of the resin feeding gate (5b) was opened, and molten polypropylene resin was fed therethrough (33 wt % of the total feed amount of resin).

Similarly, when the thermal sensor (7b) detected that the temperature near the surrounding area reached 80° C., the valve mounted to the lower part of the resin feeding gate (5c) was opened, and the final portion of molten polypropylene resin was fed through gate (5c) (25 wt. % of the total feed amount of resin).

Upon completion of feeding molten polypropylene resin, the female mold (2) was continuously lowered and the mold was clamped until the cavity clearance between the female mold (2) and male mold (1) was equal to the thickness of the final products. During this period, the mold temperature was held to 50° C.

With pressure applied (final clamping pressure: 400 tons), 30-second cooling was carried out, and thereafter, the mold was opened to remove the molding.

On the surface of the obtained molding, faint charge marks were observed around the portion in contact with the gate, but no weld-lines were observed, and the appearance was satisfactory.

Example 2

A molding with a skin material laminated on a part of the molding surface having the shape (box type) similar to that manufactured in Example 1 was manufactured according to Example 1, except that a mold assembly with rough section as shown in FIG. 12 was used. The mold assembly in FIG. 12 is similar to that used in Example 1 except that a vacuum suction pipe (8) was additionally provided in the female mold (2).

In this example, before the molding operation, a laminated square skin material comprising a polypropylene foaming sheet (foaming rate: 15 times; thickness: 3.0 mm; dimensions of side length: 250 mm×250 mm) laminated on the rear surface of a polyvinyl chloride sheet having a front surface with grain pattern (thickness: 0.6 mm) was placed so that the center of the skin material faced the resin feeding gate (5a) in FIG. 12 and each side of the skin material was parallel to each side of the cavity surface whereby the front surface of the grain pattern came in contact with the female mold cavity surface. Vacuum was applied via vacuum suction pipe (8) and the skin material was allowed to be fixed in place against the female mold cavity surface.

By design, the cavity clearance between the male and female molds was about 20 times the thickness of the final products before commencing feeding the molten polypropylene resin.

Thereafter the molding operation of Example 1 was conducted.

No weld-line was recognized on the surface of the skin material, and the molding exhibited good appearance.

Comparison Example 1

In Example 1 molten polypropylene resin was fed sequentially from three resin feeding gates (5a, 5b, and 5c). In comparison, a molding was manufactured according to Example 1, except that a specified amount of molten polypropylene resin was fed simultaneously from three resin feeding gates (5a, 5b and 5c).

The obtained molding exhibited weld-lines on the surface and the appearance was not good, i.e. not satisfactory.

Comparison Example 2

A molding was manufactured according to Example 2 except that a specified amount of molten polypropylene resin was fed simultaneously from three resin feeding gates (5a, 5b and 5c).

The obtained moldings exhibited weld-lines on the surface of the skin material laminated section and the appearance was not good.

Example 3

Using the same mold assembly used in Example 1, the molds were closed until the cavity clearance was smaller than the thickness of the final products.

When the mold opening was initiated, the molten polypropylene resin feed was started from resin feeding gate (5a). When 42 wt % of the whole or total resin amount to be fed was fed, the valve mounted to the lower part of the gate was closed and feeding of resin from the gate (5a) was stopped. At the same time mold clamping was started. The cavity clearance when the mold clamping was started (when resin feed was stopped) was set about 3 mm larger than the thickness of the final products.

By mold clamping, the molten polypropylene resin was spread in the cavity, and in the same manner as in the case of Example 1, molten polypropylene resin was successively fed from the gates (5b) and (5c). The molds were clamped until the cavity clearance was equal to the thickness of final products, and with pressure applied, (final clamping pressure: 400 tons), a 30-second cooling period was carried out. Thereafter, the mold was opened to remove the molding.

No weld-lines or charge marks were observed on the surface of the obtained molding and the appearance was extremely satisfactory.

What is claimed is:

1. A process for manufacturing thermoplastic resin moldings from molten thermoplastic resin and a mold assembly, said mold assembly comprising a male mold and a female mold, said male and female molds each having opposing mold surfaces, said mold assembly being able to open and close and define a mold cavity between said opposing mold surfaces, said mold cavity defining a cavity clearance which can be greater than, less than, or approximately equal to a final thickness of a molding of said thermoplastic resin, at least one of said male or female mold containing at least first and second thermoplastic resin feeding gates wherein said first thermoplastic resin feeding gate is adjacent to said second thermoplastic resin feeding gate, said thermoplastic resin feeding gates individually being in an opened or closed communicating relationship with respect to said mold cavity, said thermoplastic resin feeding gates including a device or devices for controlling timing and feeding of a quantity of said molten thermoplastic resin from each of said feeding gates into said mold cavity, said process comprising the steps of:

(a) feeding a first portion of said molten thermoplastic resin into said mold cavity from said first feeding gate while said first feeding gate is open and said mold assembly is open;

(b) spreading said first portion of said molten thermoplastic resin in said mold cavity, whereby a flow front is created in said first portion of said molten thermoplastic resin, by partially closing said mold assembly, said cavity clearance being kept greater than said cavity clearance defining said final thickness of said molding;

(c) feeding a second portion of said molten thermoplastic resin from said second feeding gate when said second feeding gate is open and about when said flow-front of said molten thermoplastic resin passes said second feeding gate;

(d) optionally, repeating steps (b) and (c) with additional portions of said thermoplastic resin and additional feeding gates, until all of said molten thermoplastic resin is fed, while maintaining said cavity clearance greater than said cavity clearance defining said final thickness of said molding;

(e) closing said mold assembly until said cavity clearance becomes approximately equal to said cavity clearance defining said final thickness of said molding;

(f) cooling said molten thermoplastic resin in said mold assembly with application of pressure to solidify said molten thermoplastic resin; and (g) opening said mold assembly and recovering said solidified thermoplastic resin from said mold assembly.

2. The process for manufacturing thermoplastic resin moldings according to claim 1, further comprising the step of placing a skin material entirely or partly over a surface of said male or said female mold before step (a).

3. The process for manufacturing thermoplastic resin moldings according to claim 2, wherein said skin material is placed opposite to the surface of said male or said female mold having said thermoplastic resin feeding gates.

4. The process for manufacturing thermoplastic resin moldings according to claim 3, wherein said skin material is placed over a portion of said surface of said male or said female mold, and at least one gate in step (a) is in an opposing facing relationship to said skin material.

5. The process for manufacturing thermoplastic resin moldings according to claim 3, wherein said skin material is held against said surface by a vacuum.

6. The process according to claim 1, wherein said device for controlling timing includes a thermal sensor.

7. The process according to claim 1, wherein said device for controlling timing includes valves for said feeding gates.

8. The process according to claim 1, wherein three feeding gates are present.

9. The process according to claim 1, wherein said first feeding gate includes a plurality of feeding gates.

10. The process according to claim 1, wherein said final thickness of said molding is between about one mm and about five mm.

11. The process according to claim 1, wherein said molten thermoplastic resin is selected from the group consisting of polypropylene, polyethylene, polystyrene, and an acrylonitrile styrene-butadiene copolymer.

12. The process according to claim 1, wherein said mold cavity defines an initial cavity clearance up to about seven times said final thickness of said molding prior to the step of feeding a first portion of said molten thermoplastic resin.

13. The process according to claim 2, wherein said mold cavity defines an initial cavity clearance up to about 50 times said final thickness of said molding prior to the step of feeding a first portion of said molten thermoplastic resin.

14. A process for manufacturing thermoplastic resin moldings from molten thermoplastic resin and a mold assembly, said mold assembly comprising a male mold and a female mold, said male mold and said female mold each having opposing mold surfaces, said male mold assembly being able to open and close and define a mold cavity between said opposing mold surfaces, said mold cavity defining a cavity clearance which is greater than, less than, or approximately equal to a final thickness of a molding of said thermoplastic resin, at least one of said male mold or said female mold containing at least first and second thermoplastic resin feeding gates wherein said first thermoplastic resin feeding gate is adjacent to said second thermoplastic resin feeding gate, said thermoplastic resin feeding gates individually being in an opened or closed communicating relationship with respect to said mold cavity, said thermoplastic resin feeding gates including means for controlling timing and feeding of a quantity of said molten thermoplastic resin from each feeding gate into said mold cavity, said process comprising the steps of:

(a) feeding a first portion of said molten thermoplastic resin into said mold cavity from said first feeding gate while said first feeding gate is open and said mold assembly is open;

(b) spreading said first portion of said thermoplastic molten resin in said mold cavity, whereby a flow front is created in said first portion of said thermoplastic molten resin, by partially closing said mold assembly, said cavity clearance being kept greater than said cavity clearance defining said final thickness of said molding;

(c) feeding a second portion of said molten thermoplastic resin from said second feeding gate when said second feeding gate is open and about when said flow-front of said molten thermoplastic resin passes said second feeding gate;

(d) optionally, repeating steps (b) and (c) with additional portions of said thermoplastic resin and additional feeding gates, until all of said thermoplastic molten resin is fed, while maintaining said cavity clearance greater than said cavity clearance defining said final thickness of said molding;

(e) closing said mold assembly until said cavity clearance becomes approximately equal to said cavity clearance defining said final thickness of said molding;

(f) cooling said molten thermoplastic resin in said mold assembly with application of pressure to solidify said molten thermoplastic resin; and (g) opening said mold assembly and recovering said solidified thermoplastic resin from said mold assembly.

15. The process according to claim 14, wherein said means for controlling timing and feeding of a quantity of said molten thermoplastic resin include a thermal sensor.

16. A process for manufacturing a thermoplastic resin molding from molten thermoplastic resin and a mold assembly, said mold assembly comprising a male mold and a female mold, said male mold and said female mold each having opposing mold surfaces, said mold assembly being able to open and close and define a mold cavity between said opposing mold surfaces, said mold cavity defining a cavity clearance which is greater than, less than, or approximately equal to a final thickness of said molding of said thermoplastic resin, at least one of said male mold or said female mold containing at least first and second thermoplastic resin feeding gates wherein said first thermoplastic resin feeding gate is adjacent to said second thermoplastic resin feeding gate, said thermoplastic resin feeding gates individually being in an opened or closed communicating relationship with respect to said mold cavity, said thermoplastic resin feeding gates including a device or devices for controlling timing and feeding of a quantity of said molten thermoplastic resin from each of said feeding gates into said mold cavity, said process comprising the steps of:

(a) closing said mold assembly until said cavity clearance is less than or approximately equal to said final thickness of said molding;

(b) opening said mold assembly while said cavity clearance is kept less than or approximately equal to said final thickness of said molding;

(c) feeding said first portion of said molten thermoplastic resin from a first gate wherein said cavity clearance is less than or approximately equal to said final thickness of said molding;

(d) continuing opening said mold assembly and feeding said molten thermoplastic resin, wherein said cavity clearance becomes greater than said final thickness of said molding;

(e) spreading said molten thermoplastic resin within said mold cavity, whereby a flow front is created for said first portion of said molten thermoplastic resin, by partially closing said mold assembly, wherein said cavity clearance is kept greater than said final thickness of said molding;

(f) feeding a second portion of said molten thermoplastic resin about when said flow-front passes said second gate;

(g) optionally, repeating steps (e) and (f) until all resin is fed while maintaining said cavity clearance greater than said final thickness of said molding;

(h) closing said mold assembly until said cavity clearance becomes approximately equal to said final thickness of said molding;

(i) cooling said molten thermoplastic resin with application of pressure to solidify said thermoplastic molding; and (j) opening said mold assembly and recovering said solidified thermoplastic molding form said mold assembly.

17. The process according to claim 16, further comprising the step of placing a skin material entirely or partly over a surface of said male mold or said female mold before step (a).

18. The process according to claim 17, wherein said skin material is held against said surface by a vacuum.

19. The process according to claim 16, wherein said device for controlling timing and feeding of a quantity of said molten thermoplastic resin includes a thermal sensor.

20. The process according to claim 16, wherein said final thickness of said molding is between about one mm and about five mm.

* * * * *